(12) United States Patent
Tanimura

(10) Patent No.: US 6,880,433 B1
(45) Date of Patent: Apr. 19, 2005

(54) TIGHTENING FORCE IMPARTING DEVICE

(75) Inventor: Kazuaki Tanimura, Tanabe (JP)

(73) Assignee: Kashiraishi Inc., Wakayama (JP)

( * ) Notice: Subject to any disclaimer, the term of this patent is extended or adjusted under 35 U.S.C. 154(b) by 78 days.

(21) Appl. No.: 10/344,647

(22) PCT Filed: Aug. 16, 2000

(86) PCT No.: PCT/JP00/05479

§ 371 (c)(1),
(2), (4) Date: Feb. 13, 2003

(87) PCT Pub. No.: WO02/14702

PCT Pub. Date: Feb. 21, 2002

(51) Int. Cl.[7] .............................................. B25B 13/52
(52) U.S. Cl. ................. 81/64; 81/13; 411/119
(58) Field of Search ............................. 81/13, 487, 64, 81/3.43; 411/198, 193, 235, 326, 924, 119, 411/231, 536, 372.5

(56) References Cited

U.S. PATENT DOCUMENTS

| | | | | |
|---|---|---|---|---|
| 582,424 | A | * | 5/1897 | Hunt ........................... 411/324 |
| 1,212,033 | A | * | 1/1917 | Ensign et al. ............... 411/198 |
| 1,287,270 | A | * | 12/1918 | Ensign ........................ 411/198 |
| 2,880,637 | A | * | 4/1959 | Koenig .......................... 81/10 |
| 4,493,597 | A | | 1/1985 | Rolf |
| 4,780,036 | A | * | 10/1988 | Mao et al. ................... 411/194 |
| 4,801,231 | A | * | 1/1989 | Everman ..................... 411/432 |
| 4,812,096 | A | * | 3/1989 | Peterson ..................... 411/231 |
| 5,391,032 | A | * | 2/1995 | Vassalotti ................... 411/214 |
| 6,257,813 | B1 | * | 7/2001 | Tanimura .................... 411/119 |

FOREIGN PATENT DOCUMENTS

| | | |
|---|---|---|
| CA | 1 226 156 | 9/1987 |
| JP | 5-96530 | 12/1993 |
| JP | 3011460 | 3/1995 |
| JP | 3058344 | 3/1999 |
| WO | 00/01509 | 1/2000 |

* cited by examiner

Primary Examiner—Derris H. Banks
Assistant Examiner—J Williams
(74) Attorney, Agent, or Firm—Wenderoth, Lind & Ponack, L.L.P.

(57) ABSTRACT

A tightening device includes an energizing member for energizing a tightening member to be secured to a tightening object. The energizing member integrally has at its one end an engaging part to be engaged with the tightening member. A switching member is connected to the tightening member for switching over to the constraining or operating state of the energizing force imparted to the tightening member by the energizing member. The switching member initially tightly holds the engaging part of the energizing member and the other end portion thereof to constrain the energizing force and is then separated from the engaging part and the other end portion of the energizing member to activate the energizing force.

9 Claims, 12 Drawing Sheets

(A)

(B)

(C)

(A)

(B)

TIGHTENING FORCE IMPARTING DEVICE

TECHNICAL FIELD

This invention relates to a tightening force imparting device (or tightening device) for tightening up a tightening member including a bolt, nut, screw and the like.

More particularly, this invention relates to a tightening device having a function of imparting an energizing force in the tightening direction to the tightening member to be screwed to a tightening object to be retained for a long time continuously from the beginning of tightening.

BACKGROUND ART

In general, when tightening a number of tightening members onto one tightening object, tightening force to be imparted to the tightening members must be equalized in order to assure the entire tightening strength. However, if the same worker uses the same tool for tightening the tightening members, it is difficult to equalize the tightening force to be imparted to the tightening members.

Furthermore, the tightening member secured to the tightening object is sometimes slackened due to some subsequent events (deterioration, fatigue, desiccation, etc.) happened on the tightening object.

Under the circumstances, a need has been felt for development of a tightening device capable of uniformly tightening many tightening members and preventing the tightening object tightened with tightening members from loosening over a longer span of time.

There has been known in the prior art a tightening device satisfying the aforesaid requirements, as disclosed in PCT Patent Application Publication No. WO00/01/01509.

This conventional tightening device comprises an engaging part engaged with the tightening member, which is integrally disposed on one end portion of an energizing member for energizing the tightening member to be secured onto the tightening object in the tightening direction, and a switching member connected to the energizing member for switching over to its constraining or operating state of the energizing force imparted to the tightening member. The switching member is fitted to the outer periphery of the energizing member formed of a spiral spring, so that the energizing force is prevented from being imparted to the tightening member by constraining elastic expansion of the energizing member in its fitted state (constraining function), and the energizing force is imparted to the tightening member by permitting elastic expansion of the energizing member in the state of releasing (breaking or the like) the fitted state (operating state).

When using the conventional tightening device, the switching member is engaged with the energizing member, which retains the energizing force by compression, and then, upon engaging the engaging part of the energizing member with the tightening member, the engagement of the switching member with the energizing member is released to impart the energizing force to the tightening member.

The conventional tightening device has an advantage in that it is simple in structure and easy to handle.

However, the conventional tightening device has a disadvantageous possibility of releasing the engagement of the switching member with the energizing member where the energizing force is strong, because the switching member is merely engaged with the outer periphery of the energizing member, thus unsteadily hindering the expansion of the energizing member. Besides, the switching member in its released state stays behind around the outer periphery of the energizing member, thus leading to inhibition of the energizing function of the energizing member and causing a corrosion around the energizing member.

DISCLOSURE OF THE INVENTION

The present invention was made in view of the foregoing problems of the conventional tightening device and seeks to provide a tightening device (or tightening force imparting device) having a switching member capable of stably constraining an energizing force of the energizing member, which is to be imparted to a tightening member, and which can be separated from the periphery of the energizing member when activating the energizing member to impart the energizing force to the tightening member.

As one means for solving the problems described above, according to the present invention, there is provided a tightening force imparting device comprising an energizing member for energizing a tightening member to be secured to a tightening object in a tightening direction, which energizing member integrally has at its one end portion an engaging part to be engaged with the tightening member, and a switching member to be connected to the tightening member for switching over to the constraining or operating state of the energizing force imparted to the tightening member by the energizing member (to impart a rotary force in the tightening direction to allow for tightening rotation of the tightening member by the energizing member, and then holding of the tightening member to prevent loosening). The tightening device is characterized in that the switching member holds tight the engaging part formed on the one end portion of the energizing member and the other end portion thereof to constrain the energizing force and is separated from the engaging part and the other end portion of the energizing member to activate the energizing force.

According to this solution, the switching member is initially held tight from both sides to stably constrain the energizing force. Furthermore, the switching member is separated from the energizing member when activating the energizing member to impart the energizing force to the tightening member (i.e., to impart a rotary force in the tightening direction to provide for tightening rotation and then holding of the tightening member to prevent its loosing), so that the switching member can be separated from the periphery of the energizing member.

As another means for solving the problems described above, according to the present invention, the switching member in the tightening device is separated slidably from the engaging part and the other end portion of the energizing member while engaging the engaging part of the energizing member with the tightening member.

According to this solution, the switching member can be separated automatically from the energizing member as the engaging part of the energizing member with the tightening member.

As still another means for solving the problems described above, according to the present invention, the energizing member is formed of a spiral spring and contained within a casing, the engaging part of the one end portion of the energizing member is placed at the center of the spiral spring, and the other end portion of the energizing member is placed at the outer periphery of the spiral spring.

According to this solution, the engaging part of the energizing member of the spiral spring contained within the casing serves as a base point of the energizing force.

The casing of the tightening device has engaging dents for permitting the switching member to be engaged with the casing in the circumferential direction and the switching member to slidably move in the axial direction, and the engaging member has engaging cuts correspondingly to the engaging dents formed in the casing.

According to this solution, the casing and the switching member can be engaged steadily with each other by means of the engaging dents and cuts.

The engaging dents and cuts formed in the casing and the switching member in the tightening device respectively can assume a polygonal shape so as to enable variation of the engagement angle at which the casing and switching member are engaged, wherein the engaging cuts of the switching member are formed in the peripheral portion of a flange having a larger diameter than a support part of the switching member.

According to this solution, the engagement angle between the casing and the switching member is variable.

The support part of the switching member in the tightening device can be rotatable within the casing while holding the engaging part and the other end portion of the energizing member in the state of separating the flange with engaging cuts from the engaging dents formed in the casing.

According to this solution, the energizing force of the energizing member can be adjusted by winding up or unloosing the energizing member with rotation of the switching member in the released state from the engaging dents of the casing.

The tightening device may be provided with a fixing member attached directly or indirectly to one side of the casing opposite to a tightening object to be retained in a non-rotatable manner.

According to this solution, the casing can be immovably fixed to the tightening object with the fixing member.

DETAILED DESCRIPTION OF THE INVENTION

FIG. 1 through FIG. 6 show the first preferred embodiment for achieving the tightening device according to the present invention.

Shown as the first embodiment is a device comprising a tightening member B such as a hexagonal nut to be fitted onto a bolt retained by a tightening object A formed of concrete or the like.

Figure 1:
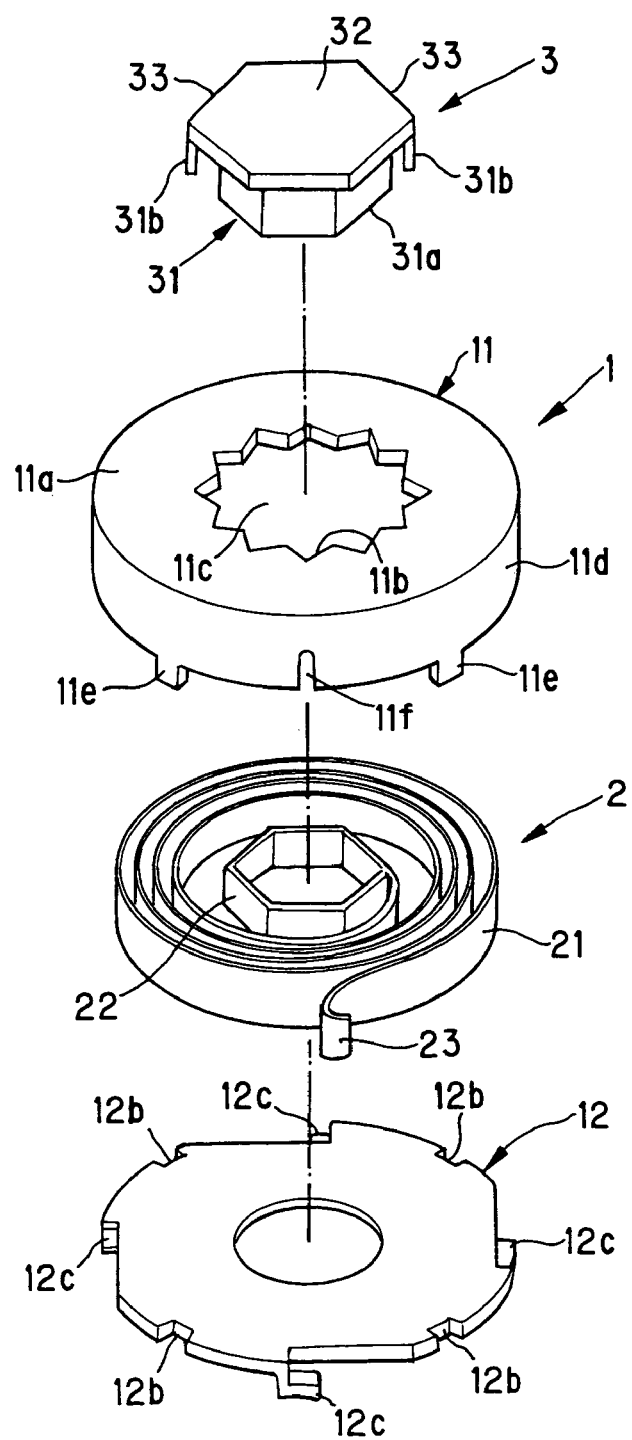
FIG. 1 is a perspective exploded view showing one preferred embodiment of a tightening device according to the present invention.

The tightening device of this first embodiment comprises a casing 1, an energizing member 2, and a switching member 3 as shown in FIG. 1.

In general, it is desirable to make the casing 1, energizing member 2 and switching member 3 of metal, but these may be made of synthetic resin or other single or composite material.

The casing 1 comprises an inverted cup-shaped main body 11, and a bottom member 12 which is made of a plate with a hole and deformed so as to close up the lower opening of the main body 11. The main body 11 has a top plate 11a with a sliding hole 11c for allowing the switching member 3 to slide, a cylindrical side wall 11d provided with fixing pieces 11e to be caught on the fringe of the bottom member 12 by being bent inwardly at 90 degrees, and an engaging slit 11f for receiving the energizing member 2. The sliding hole is defined by an inner peripheral edge of engaging dents 11b. The bottom member 12 comprises a centrally located through hole 12a for allowing the tightening member B to pass therethrough, squarish U-shaped fixing slots 12b for receiving the fixing pieces 11e of the main body 11, and L-shaped fixing pieces 12c by which the tightening member B a is indirectly connected to the tightening object A in a non-rotatable manner.

The energizing member 2 comprises a spring body 21 composed of a spiral spring of a belt-like steel sheet, an engaging part 22 formed by folding the inner end portion of the spiral spring body into a hexagonal shape so as to bring the tightening member B into engagement therewith, and a hook part 23 formed by curving the outer end portion of the spiral spring body 21 so as to be secured into the engaging slit 11f in the main body 11. The spring body 21 is wound sinistrorsely (counterclockwise).

The switching member 3 comprises a support part 31 for retaining the energizing member 2, and a flange 32 having a larger diameter than the support part 31. The support part 31 has a hexagonal inner support 31a fitted into the engaging part 22 of the energizing member 2, and two outer supports 31b, which are each formed like a short pillar bent at 90 degrees so as to come into contact with the outer peripheral surface of the spring body 21 of the energizing member 2 in the compressed state. In the peripheral surface of the flange 32, there are formed engaging cuts 33 assuming a hexagonal shape on the whole so as to be engaged with the engaging dents 11b of the main body 11 of the casing 1 in an angular-adjustable manner.

The casing 1, energizing member 2 and switching member 3 are assembled by placing the energizing member 2 into the main body 11 of the casing 1, bringing the hook part 23 of the energizing member 2 into engagement with the engaging slit 11f formed in the main body 11 of the casing 1, and securing the bottom member 12 to the main body 11 of the casing 1. Before using, the energizing member 2 placed in the casing 1 is compressed. Then, the energizing member 2 is retained in its compressed state by the switching member 3, making preparations for bringing the sliding hole 11c in the main body 11 of the casing 1 into engagement with the flange defined by the engaging cuts 33 (cf. FIG. 5(A) and FIG. 6(A)).

In this state, the energizing force of the energizing member 2 is constrained and prevented from being imparted to the engaging part 22. This constrained state of the energizing member is stably maintained by the holding action of the inner support 31a and outer support 31b of the support part 31 of the switching member 3.

The energizing member 2 may be compressed before shipment of the finished device. With change of the engagement angle between the engaging dents formed 11b around the sliding hole 11c in the main body 11 of casing 1 and engaging cuts 33 formed around the flange of the switching member 3, the degree of compression of the energizing member 2 can be changed to adjust the energizing force.

Figure 2:
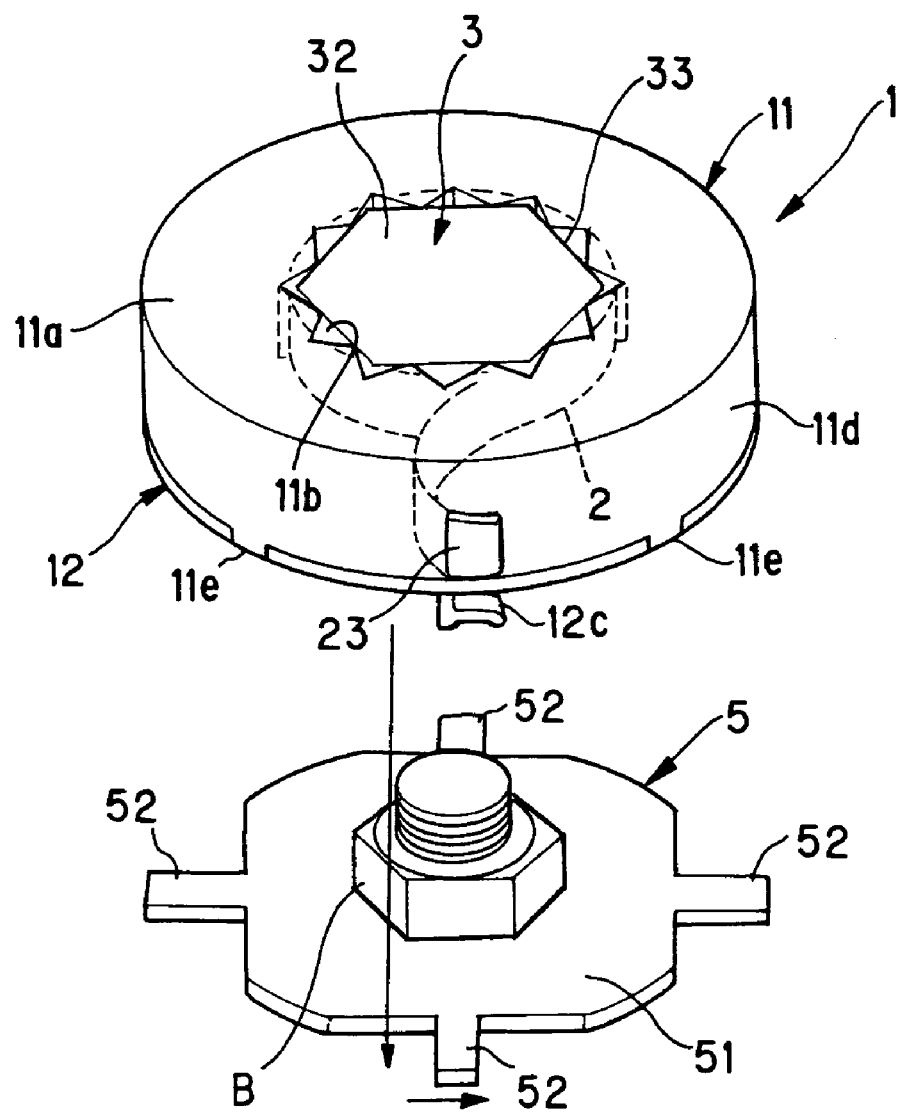
FIG. 2 is a diagram showing an initial state of assembling the device of FIG. 1 in use.
Figure 5:
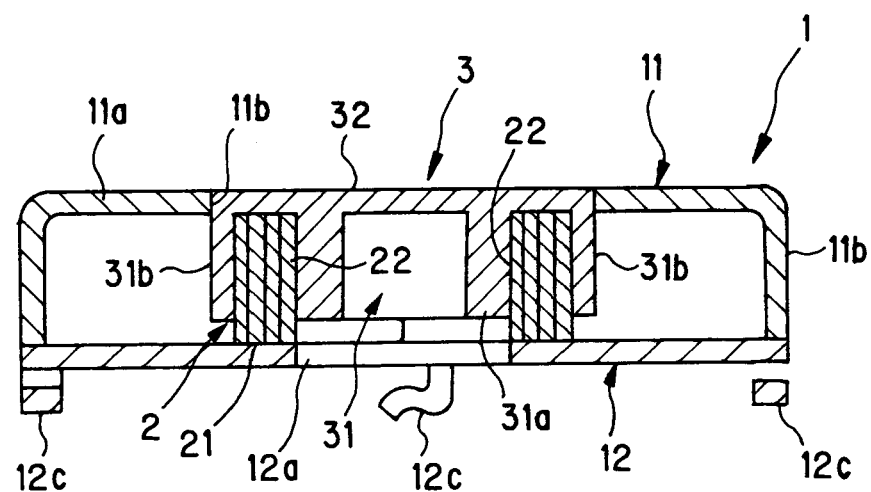
FIGS. 5(A)–(C) are expanded sectional views of FIG. 2 through FIG. 4, wherein FIG. 5(A) corresponds to FIG. 2, FIG. 5(B) corresponds to FIG. 3, and FIG. 5(C) corresponds to FIG. 4.
Figure 5:
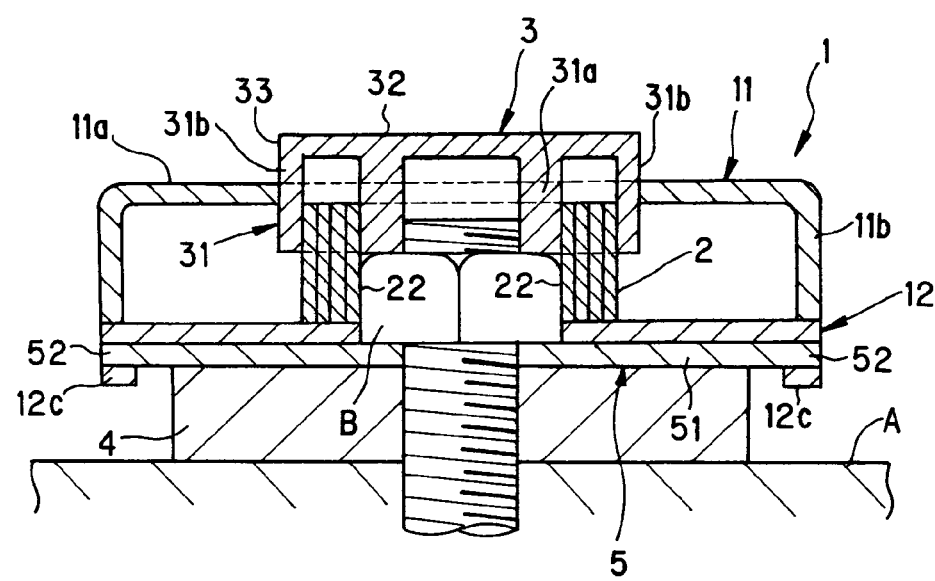
Figure 5:
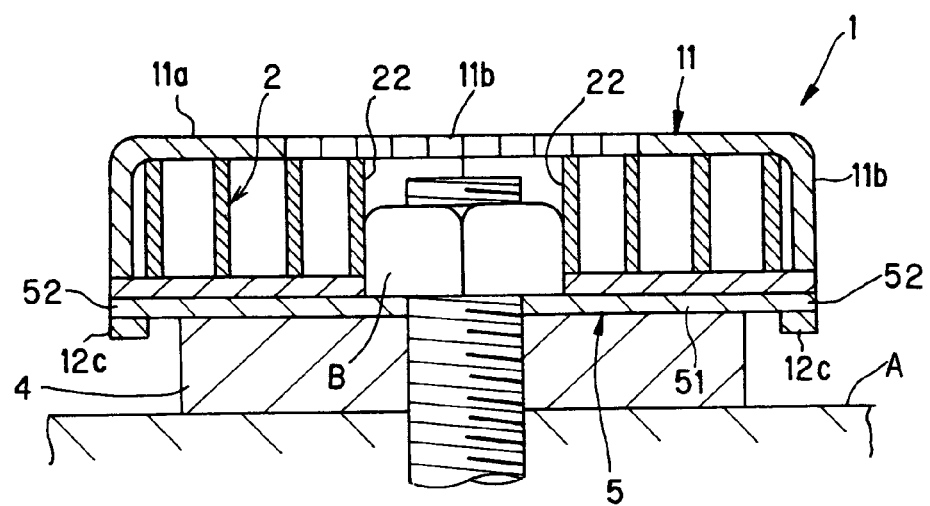
Figure 6:
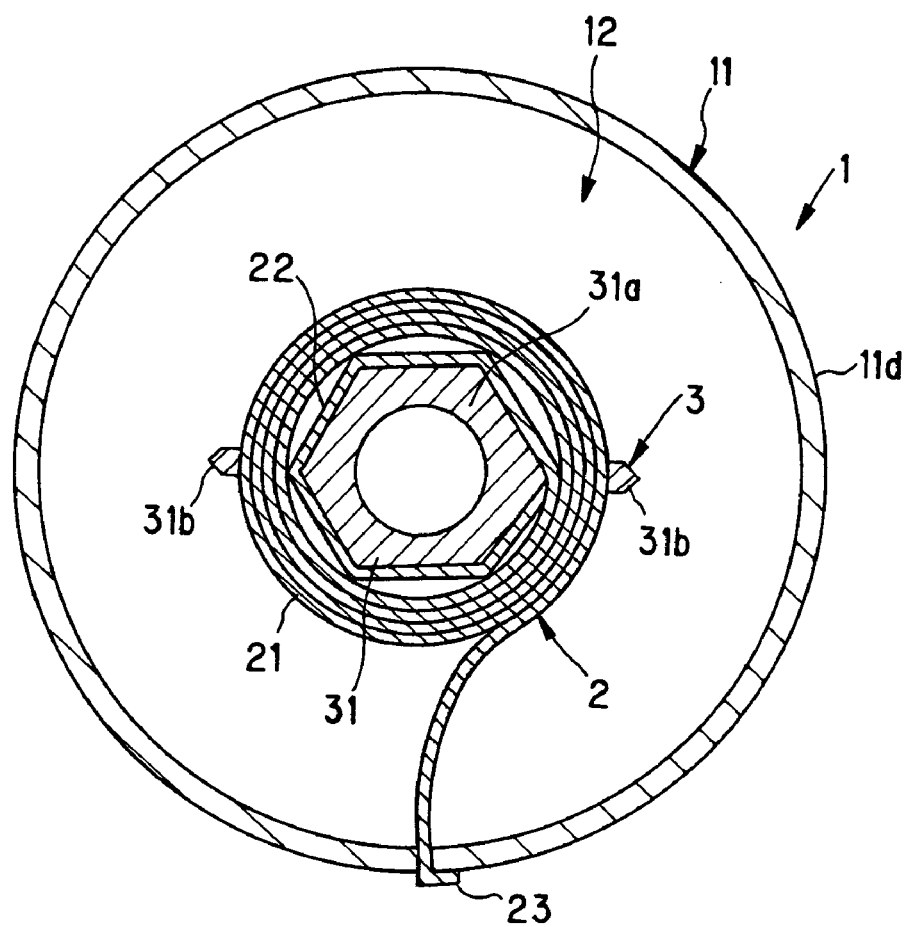
FIGS. 6(A)–(C) are cross sectional views of FIGS. 5(A)–(C), wherein FIG. 6(A) corresponds to FIG. 5(A), FIG. 6(B) corresponds to FIG. 5(B), and FIG. 6(C) corresponds to FIG. 5(C).
Figure 6:
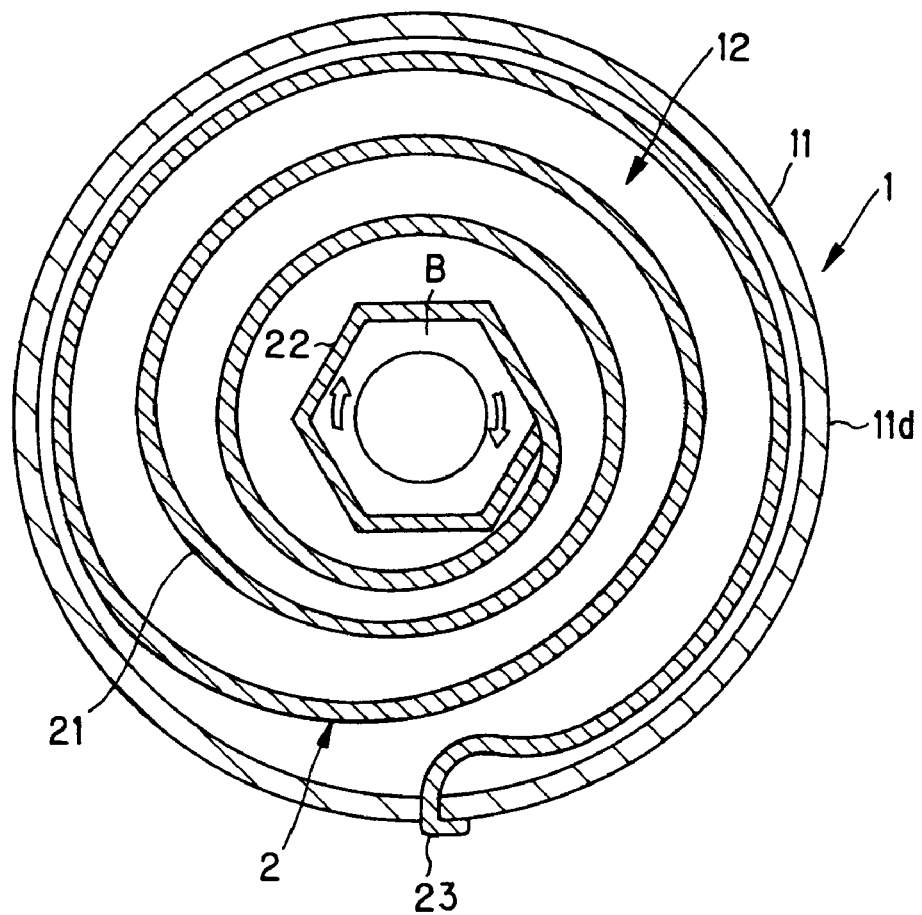

In this first embodiment, a mount seat 5 is attached onto the tightening object A through a spacing block 4 as shown in FIG. 2 and FIG. 5.

The spacing block 4 and mount seat 5 are fixed onto the tightening object A with the tightening member B by screwing. The mount seat 5 has a body plate 51 provided on its peripheral portion with engaging tabs 52 circumferentially arranged at right angles so as to prevent the fixing member of the bottom member 12 attached to the casing 1 from rotating.

According to this structure in the first embodiment, the casing 1, energizing member 2 and switching member 3 assembled as noted above are united with the tightening member B by being placed on the top of the tightening member B and being slightly rotated, as shown in FIG. 2. Thus, the fitting of these components onto the tightening member does not require an onerous process.

Figure 3:
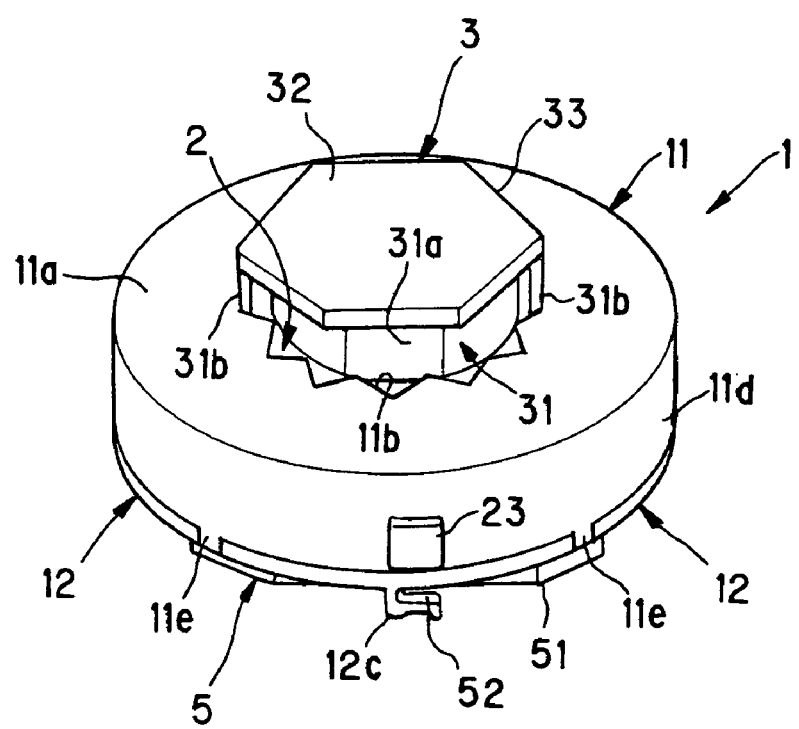
FIG. 3 is a diagram showing an intermediate state of assembling the device of FIG. 1 in use.

Upon fitting these components onto the tightening member, the tightening member B fitted into the engaging part 22 of the energizing member 2 through the hole 12a in the bottom member 12 of the casing 1 pushes up the switching member 3 by sliding as shown in FIG. 3 and FIG. 5(B). In the state of pushing up the switching member 2, the energizing force of the aforementioned energizing member 2 remains constrained.

Figure 4:
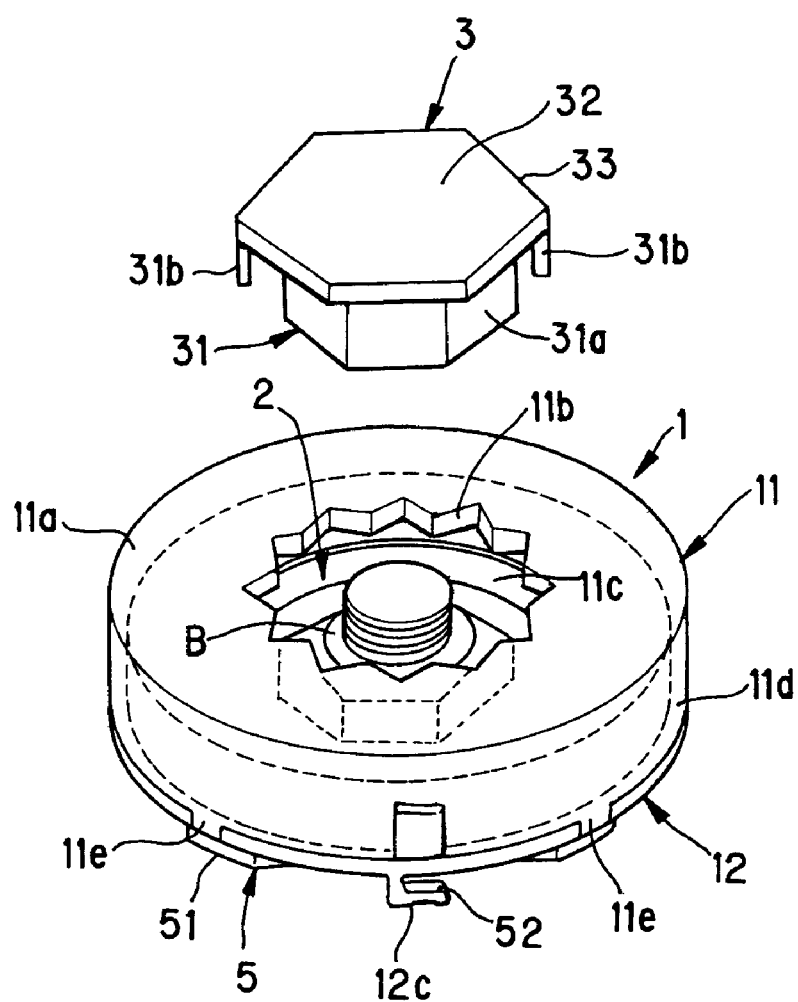
FIG. 4 is a diagram showing the state of completion of assembling the device of FIG. 1 in use.

Thereafter, the switching member 3 is pulled out from the energizing member 2 and the sliding hole 11c in the main body 11 of the casing 1, as shown in FIG. 4. At this time, the switching member 3 can easily be pulled off by operating the flange 32 of the switching member 3 with the fingers of a user.

As a result, the energizing member 2 is released from the switching member 3 to impart the energizing force of the energizing member 2 to the engaging part 22 (i.e., to impart a rotary force in the tightening direction to allow tightening rotation of the tightening member B held by the engaging part 22 and then retention of the tightening member B in a tightened state), as shown in FIG. 5(C) and FIG. 6(B). Therefore, the tightening member B is continuously constricted (i.e. prevented from loosening) by the energizing force of the energizing member 2.

In this state, the switching member 3 is disengaged from the casing 1 and energizing member 2. Thus, the possibility that the switching member 3 attached to the casing and energizing member constitutes a limiting factor of suppressing the function of energizing member 2 and causing a corrosion can be eliminated.

The sliding hole 11c in the main body 11 of the open casing 1 may be closed with a cover or the like if required.

Figure 7:
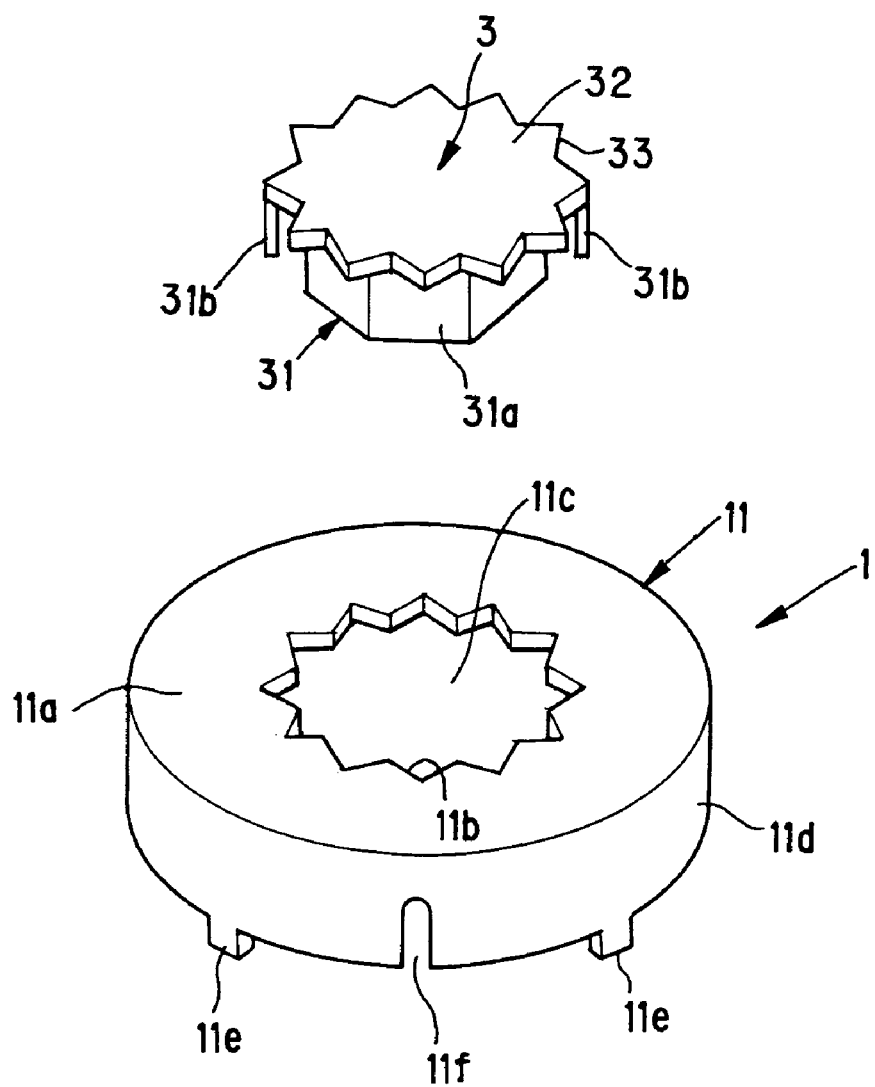
FIG. 7 is an exploded view showing the principal portion of a second preferred embodiment of the tightening device according to the present invention.

FIG. 7 shows the second preferred embodiment for carrying out the present invention.

This second embodiment can prevent any foreign matter from entering inside through between the engaging dent 11b in the main body 11 of the casing 1 and the engaging cut 33 of the switching member 3 before use.

Figure 8:
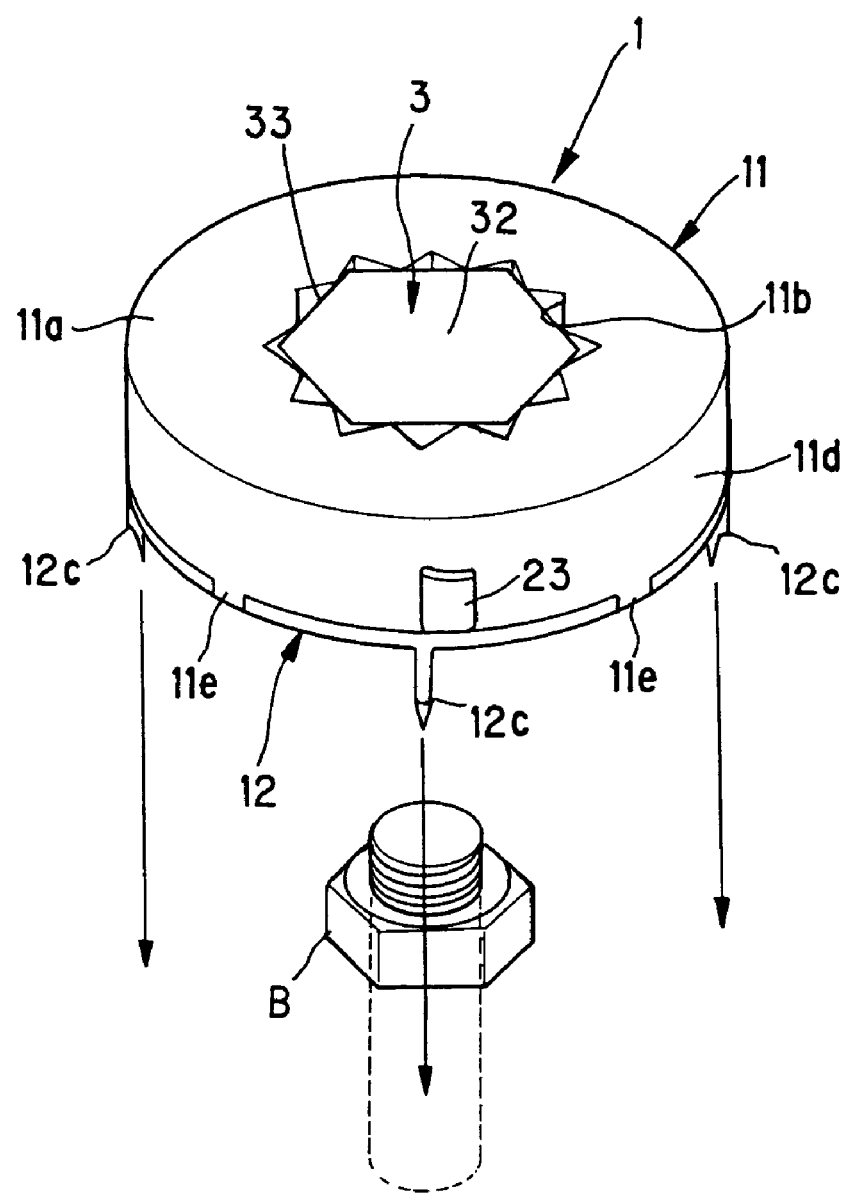
FIG. 8 is an exploded view showing a third preferred embodiment of the tightening device in a state of being assembled in use according to the present invention.

FIG. 8 shows the third preferred embodiment for carrying out the present invention.

In this third embodiment, the fixing pieces 12c extending from the bottom member 12 of the casing 1 in the first embodiment are each modified into a cuneatic shape.

According to this third embodiment, the fixing pieces 12c of the bottom member 12 of the casing 1 can be mounted directly into the tightening object A so as to secure the device in a non-rotatable manner. This embodiment eliminates the need for the spacing block 4 and mount seat 5, and therefore, is specifically effective for the tightening object A when made of wood.

Figure 9:
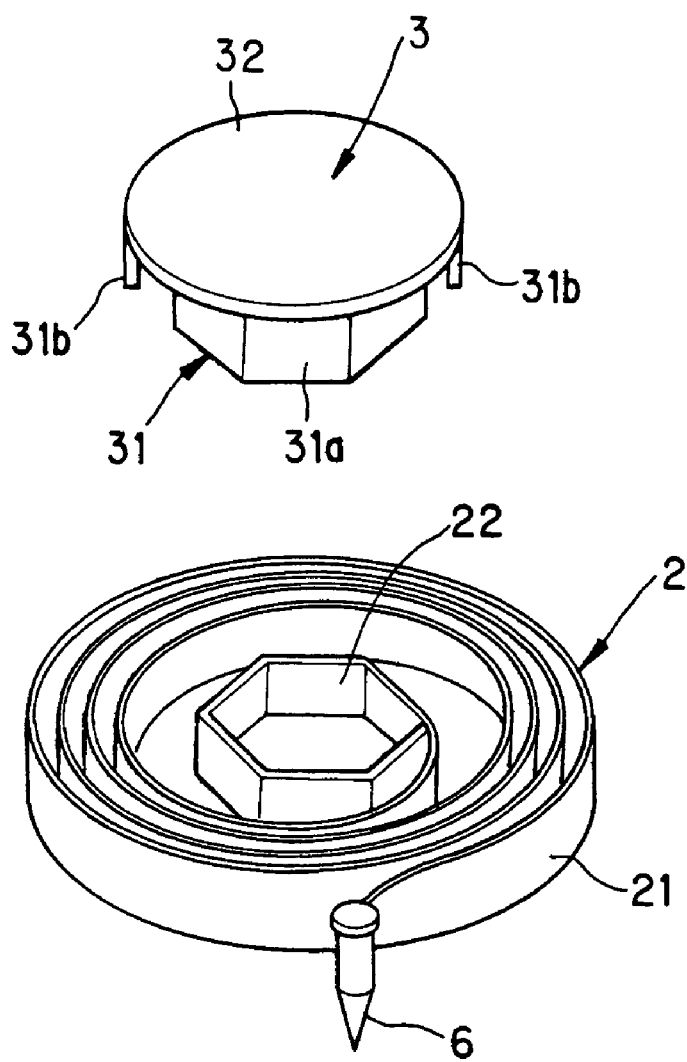
FIG. 9 is an exploded view showing a fourth preferred embodiment of the tightening device according to the present invention.

FIG. 9 shows the fourth preferred embodiment for carrying out the present invention.

In the fourth embodiment, the casing 1 found in the first to third embodiments is left out. The switching member 3 and engaging cuts 33 are omitted as well as the casing 1.

In place of the casing 1, an engaging pin 6 for securing the energizing member 2 directly onto the tightening object A in a non-rotatable manner is attached to the outer end of the energizing member 2.

According to this fourth embodiment, the overall structure of the device can be made simple.

In the first to fourth embodiments, the energizing member 2 may be formed of a slidably expanding spring.

INDUSTRIAL APPLICABILITY

The present invention may have applicability to a tightening object of metal, synthetic resin, concrete, wood or other pertinent material.

Furthermore, as the tightening member, there may be used not only bolts, nuts and screws, but also all kinds of tightening elements capable of being tightened up to be secured to the tightening object.

What is claimed is:

1. A tightening force imparting device comprising an energizing member for energizing a tightening member to be secured to a tightening object in a tightening direction, said energizing member being provided integrally at a first end portion with an engaging part to be engaged with the tightening member, and a switching member to be connected to the tightening member for switching over to one of the constraining and operating states of the energizing force imparted to the tightening member by the energizing member, characterized by the switching member comprising a support part having an inner support engaged with said engaging part of said energizing member and outer supports in contact with the outer peripheral surface of said energizing member so as to constrain the energizing force, and a casing containing said energizing member with a second end portion caught by said casing, said casing having a sliding hole for allowing said switching member to be pushed up by said tightening member to allow separation of said switching member from said engaging part of said energizing member.

2. The tightening force imparting device set forth in claim 1, wherein said energizing member is formed of a spiral spring, the engaging part at the first end portion of said energizing member is placed at a center of said spiral spring, and the second end portion of said energizing member is placed at an outer periphery of said spiral spring.

3. The tightening force imparting device set forth in claim 2, wherein said casing has engaging dents for permitting said switching member to be engaged with said casing in the circumferential direction and said switching member to slidably move in the axial direction, and said engaging member has engaging cuts corresponding to the engaging dents formed in said casing.

4. The tightening force imparting device set forth in claim 3, wherein said engaging dents and cuts formed in said casing and said switching member respectively assume a polygonal shape so as to enable variation of an engagement angle at which said casing and switching member are engaged, said engaging cuts of said switching member being formed in a peripheral portion of a flange having a larger diameter than a support part of said switching member.

5. The tightening force imparting device set forth in claim 4, wherein said support part of said switching member is rotatable within said casing while holding said engaging part and the second end portion of said energizing member in the state of separating said flange with said engaging cuts from said engaging dents formed in said casing.

6. The tightening force imparting device set forth in claim 2, further comprising a fixing member attached directly or indirectly to one side of said casing opposite to a tightening object to be retained in a non-rotatable manner.

7. The tightening force imparting device set forth in claim 3, further comprising a fixing member attached directly or indirectly to one side of said casing opposite to a tightening object to be retained in a non-rotatable manner.

8. The tightening force imparting device set forth in claim 4, further comprising a fixing member attached directly or indirectly to one side of said casing opposite to a tightening object to be retained in a non-rotatable manner.

9. The tightening force imparting device set forth in claim 5, further comprising a fixing member attached directly or indirectly to one side of said casing opposite to a tightening object to be retained in a non-rotatable manner.

* * * * *